(12) United States Patent
Liu et al.

(10) Patent No.: US 12,459,337 B2
(45) Date of Patent: Nov. 4, 2025

(54) HEAT EXCHANGER FOR VEHICLE AIR CONDITIONING SYSTEM, VEHICLE AIR CONDITIONING SYSTEM AND VEHICLE

(71) Applicant: CONTEMPORARY AMPEREX TECHNOLOGY (HONG KONG) LIMITED, Hong Kong (CN)

(72) Inventors: Yao Liu, Ningde (CN); Yu Zhao, Ningde (CN); Zhengzhu Zhou, Ningde (CN); Liwen Jiang, Ningde (CN); Kai Wu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 192 days.

(21) Appl. No.: 18/453,150

(22) Filed: Aug. 21, 2023

(65) Prior Publication Data
US 2023/0391167 A1 Dec. 7, 2023

Related U.S. Application Data

(63) Continuation of application No. PCT/CN2021/141774, filed on Dec. 27, 2021.

(51) Int. Cl.
*B60H 1/32* (2006.01)
*F28D 1/04* (2006.01)
(Continued)

(52) U.S. Cl.
CPC ....... *B60H 1/32331* (2019.05); *B60H 1/3227* (2013.01); *F28D 1/0435* (2013.01);
(Continued)

(58) Field of Classification Search
CPC ........ B60H 1/32331; F28F 17/005; F24F 1/42
See application file for complete search history.

(56) References Cited

U.S. PATENT DOCUMENTS 3,306,067 A * 2/1967 Anglin ................ B60H 1/3227
62/226
4,067,205 A * 1/1978 Mayhue ................ F25B 19/00
62/506

(Continued)

FOREIGN PATENT DOCUMENTS

CN 202648032 U 1/2013
CN 108248336 A 7/2018
(Continued)

OTHER PUBLICATIONS

Extended European Search Report for EP application No. 21969294. 4, dated May 16, 2024.
(Continued)

*Primary Examiner* — Christopher R Zerphey
(74) *Attorney, Agent, or Firm* — Ladas & Parry LLP

(57) ABSTRACT

A heat exchanger for a vehicular air conditioning system is disclosed. The heat changer includes a heat exchanger body, a water storage tank, and a condensate water circulating device. The heat exchanger body is provided with an air-inlet side and an air-outlet side. The air-inlet side is configured to enable an external air flow to enter the heat exchanger body, so that the air flow conducts heat exchange with a refrigerant in the heat exchanger body. The air-outlet side is configured to exhaust the air flow completing heat exchange with the refrigerant. The water storage tank is arranged below the heat exchanger body and is configured to store condensate water formed on the heat exchanger body. The condensate water circulating device is configured to transport cold water in the water storage tank to the air-inlet side of the heat exchanger body for heat exchange with the heat exchanger body.

10 Claims, 7 Drawing Sheets

(51) Int. Cl.
*F28D 1/053* (2006.01)
*F28F 1/12* (2006.01)
*F28F 17/00* (2006.01)

(52) U.S. Cl.
CPC .......... *F28D 1/05383* (2013.01); *F28F 1/126* (2013.01); *F28F 17/005* (2013.01); *F28F 2265/06* (2013.01); *F28F 2265/22* (2013.01)

(56) References Cited

U.S. PATENT DOCUMENTS

| | | | | |
|---|---|---|---|---|
| 4,494,384 | A * | 1/1985 | Lott | F01P 9/02 |
| | | | | 62/506 |
| 5,074,121 | A * | 12/1991 | Morris | B60H 3/022 |
| | | | | 62/274 |
| 5,651,259 | A * | 7/1997 | Twyman | B60S 1/50 |
| | | | | 62/93 |
| 10,480,163 | B2 * | 11/2019 | Dudar | B60N 3/16 |
| 2019/0135083 | A1 | 5/2019 | Danjo et al. | |

FOREIGN PATENT DOCUMENTS

| | | |
|---|---|---|
| CN | 109414975 A | 3/2019 |
| CN | 111688443 A | 9/2020 |
| CN | 212921063 U | 4/2021 |
| EP | 3187708 B1 | 10/2018 |
| JP | 2004314709 A | 11/2004 |
| WO | 2018007708 A1 | 1/2018 |

OTHER PUBLICATIONS

International Search Report for International Application PCT/CN2021/141774 dated Oct. 8, 2022.
Written Opinion of International Search Authority for International Application PCT/CN2021/141774 dated Oct. 8, 2022.

* cited by examiner

HEAT EXCHANGER FOR VEHICLE AIR CONDITIONING SYSTEM, VEHICLE AIR CONDITIONING SYSTEM AND VEHICLE

CROSS REFERENCE TO RELATED APPLICATION

This application is a continuation of International Patent Application No. PCT/CN2021/141774, filed on Dec. 27, 2021, which is incorporated by reference in its entirety.

TECHNICAL FIELD

This application relates to the field of automobile manufacturing, and particularly relates to a heat exchanger for a vehicular air conditioning system, the vehicular air conditioning system and a vehicle.

BACKGROUND

This part merely provides background art related to the application and is not inevitably prior art.

At present, to make a passenger compartment have a comfortable temperature and humidity environment, an air conditioning system has been a standard configuration of a vehicle. The air conditioning system of the vehicle will generate much condensate water during refrigeration, particularly with high humidity. At present, a conventional condensate water treatment mode is to drain away condensate water directly out of the vehicle, such that the cooling capacity of condensate water is not utilized well.

SUMMARY

The objective of the application is to provide a condensate water recycling device and a vehicle to recycle the cooling capacity of condensate water generated by an air conditioning system. To achieve the above objective, the application provides the technical solution as follows:

The embodiment in the first aspect of the application provides a heat exchanger for a vehicular air conditioning system. The heat exchanger for a vehicular air conditioning system includes a heat exchanger body, a water storage tank and a condensate water circulating device. The heat exchanger body is provided with an air-inlet side and an air-outlet side, where the air-inlet side is configured to enable an external air flow to enter the heat exchanger body, so that the air flow conducts heat exchange with a refrigerant in the heat exchanger body; the air-outlet side is configured to exhaust the air flow completing heat exchange with the refrigerant; and the water storage tank is arranged below the heat exchanger body and is configured to store condensate water formed on the heat exchanger body. The condensate water circulating device is configured to transport the condensate water in the water storage tank to the air-inlet side of the heat exchanger body for heat exchange with the heat exchanger body.

According to the heat exchanger for a vehicular air conditioning system in the embodiments of the application, the heat exchanger body will form condensate water during heat exchange. The water storage tank located below the heat exchanger body is capable of storing the condensate water, and the condensate water circulating device transports the condensate water in the water storage tank to the air-inlet side of the heat exchanger body for heat exchange. Thus, when the heat exchanger body is subject to heat exchange, external high-temperature air first exchanges heat with the condensate water transported by the condensate water circulating device to the air-inlet side, and then the cooled air flows through the heat exchanger body for secondary heat exchange. Therefore, the external high-temperature air can be cooled for the first time by utilizing the cooling capacity of the condensate water, so that the cooling capacity of the condensate water is more effectively utilized. According to the heat exchanger for a vehicular air conditioning system in the embodiments of the application, the condensate water generated by the heat exchanger body is stored and is transported to the air-inlet side of the heat exchanger body, so that the high-temperature air is cooled for the first time by utilizing the cooling capacity of the condensate water, and thus, the cooling capacity of the condensate water can be recovered and utilized.

In some embodiments of the application, the condensate water circulating device includes a water cooler and a power device. The water cooler is arranged at the air-inlet side of the heat exchanger body. The power device is configured to transport the condensate water stored in the water storage tank to the water cooler. By arranging the water cooler at the air-inlet side of the heat exchanger body, thus, when the high-temperature air is subject to heat exchange, it first passes through the water cooler. Because of low temperature of the condensate water in the water cooler, the high-temperature air needing heat exchange can be cooled for the first time. The air cooled for the first time then flows through the heat exchanger body for secondary cooling. Therefore, the high-temperature gas can be cooled by utilizing the cooling capacity of the condensate water well.

In some embodiments of the application, the heat exchanger further includes a catchment tray, where the catchment tray is arranged at a bottom of the heat exchanger body, is configured to collect the condensate water formed on the heat exchanger body, and is communicated with an internal space of the water storage tank. By arranging the catchment tray at the bottom of the heat exchanger body, the condensate water can be collected more conveniently, and the condensate water is exported into the water storage tank. Therefore, the condensate water can be prevented from flowing out of the water storage tank.

In some embodiments of the application, the catchment tray is further located at the bottom of the water cooler and is further configured to collect the condensate water formed on the water cooler. In the embodiment, the condensate water flows through the interior of the water cooler. Because of low temperature of the condensate water, when the high-temperature gas passes through the water cooler, the condensate water will be formed on the surface of the water cooler as well. Therefore, the catchment tray is arranged at the bottoms of the heat exchanger body and the water cooler at the same time, and thus, the condensate water formed on the heat exchanger body and the water cooler can be collected at the same time.

In some embodiments of the application, the heat exchanger further includes a reversing valve arranged on the water storage tank, where a water outlet of the water cooler is connected to the reversing valve, the water storage tank is further provided with a drain outlet and a humidifying connector, the drain outlet is configured to drain away the condensate water, and the humidifying connector is configured to be connected to an external sprayer; the reversing valve has a first state and a second state capable of being switched; in a case where the reversing valve is in the first state, the water outlet of the water cooler is connected to the drain outlet, and the water outlet of the water cooler is disconnected to the humidifying connector; and in a case where the reversing valve is in the second state, the water outlet of the water cooler is connected to the humidifying connector, and the water outlet of the water cooler is disconnected to the drain outlet. In the embodiment, after the condensate water in the water cooler is subject to heat exchange with the external high-temperature air, the condensate water completing heat exchange can be treated according to different demands. Specifically, the condensate water after recycling cooling capacity can be drained away. At the time, the reversing valve can be switched to the first state, and thus, the condensate water can be drained away through the drain outlet. Alternatively, when air in the passenger compartment is dry, the condensate water after recycling cooling capacity can be used for humidifying air in the passenger compartment as well. At the time, the reversing valve can be switched to the second state to transport the condensate water to the humidifier, so as to further utilize the condensate water.

In some embodiments of the application, the heat exchanger further includes a switching valve arranged on the water storage tank, where the switching valve is connected to the water outlet of the water cooler, the water storage tank is further provided with a water connector, the water connector is configured to provide a user with domestic water, and the water connector is connected to the water outlet of the water cooler through the switching valve. By arranging the water connector and arranging the switching valve between the water connector and the water outlet of the condensate water, the condensate water exchanging heat with the water cooler has multiple purposes.

In some embodiments of the application, the reversing valve further has a third state, and in a case where the reversing valve is in the third state, the water outlet of the water cooler is disconnected to both the drain outlet and the humidifying connector. The reversing valve can be matched with the switching valve in use. Specifically, the switching valve is opened while providing the user with domestic water, and meanwhile, the reversing valve is switched to the third state. At the time, when the reversing valve is in the third state, the water outlet of the water cooler is disconnected to both the drain outlet and the humidifying connector. Thus, the condensate water only flows out from the water connector rather than flowing through the drain outlet and the humidifying connector. Therefore, it can be ensured that the water quantity at the water connector can meet the usage requirement.

In some embodiments of the application, the heat exchanger further includes a liquid level sensor and a controller, where the liquid level sensor and the power device both are electrically connected to the controller, the liquid level sensor is arranged in the water storage tank and is configured to detect a liquid level height of the condensate water in the water storage tank, and the controller is configured to start the power device in a case where the liquid level height of the condensate water in the water storage tank reaches a preset value. In the embodiment, the controller is electrically connected to the liquid level sensor and the power device respectively. The controller is capable of receiving liquid level height information sent by the liquid level sensor. When the liquid level height reaches a preset value, the controller is capable of starting the power device, so as to prevent the condensate water in the water storage tank exceeding a water storage limit of the water storage tank and causing overflow.

In some embodiments of the application, the power device is a water pump. The condensate water in the water storage tank is transported to the water cooler through the water pump. As the water pump is conventional and has various models, water pumps with different models can be selected as required, and substitutes can be more conveniently found in subsequent maintenance.

In some embodiments of the application, the heat exchanger body is internally provided with a refrigerant channel, and the heat exchanger body is provided with a refrigerant inlet and a refrigerant outlet. A refrigerant is transported in the refrigerant channel inside the heat exchanger body. Therefore, the refrigerant in the refrigerant channel is capable of exchanging heat with air in an external environment, so as to play a role of cooling or heating air.

The embodiment in the second aspect of the application provides a vehicular air conditioning system, including the heat exchanger for a vehicular air conditioning system in any one embodiment in the first aspect.

In the embodiment, since the vehicular air conditioning system includes the heat exchanger for a vehicular air conditioning system in any one embodiment in the first aspect, it also has the beneficial effects in any one embodiment in the first aspect, which is not repeatedly described herein.

In some embodiments of the application, the heat exchanger further includes a reversing valve arranged on the water storage tank, where a water outlet of the water cooler is connected to the reversing valve, the water storage tank is further provided with a drain outlet and a humidifying connector, and the drain outlet is configured to drain away the condensate water; the reversing valve has a first state and a second state capable of being switched; in a case where the reversing valve is in the first state, the water outlet of the water cooler is connected to the drain outlet, and the water outlet of the water cooler is disconnected to the humidifying connector; and in a case where the reversing valve is in the second state, the water outlet of the water cooler is connected to the humidifying connector, and the water outlet of the water cooler is disconnected to the drain outlet. The vehicular air conditioning system further includes a sprayer connected to the humidifying connector. The vehicular air conditioning system further includes the sprayer connected to the humidifying connector. The reversing valve has the first state and the second state capable of being switched. After the condensate water in the water cooler is subject to heat exchange with the external high-temperature air, the condensate water completing heat exchange can be treated according to different demands. Specifically, the condensate water after recycling cooling capacity can be drained away. At the time, the reversing valve can be switched to the first state, and thus, the condensate water can be drained away through the drain outlet. Alternatively, when air in the passenger compartment is dry, the condensate water after recycling cooling capacity can be used for humidifying air in the passenger compartment as well. At the time, the reversing valve can be switched to the second state to transport the condensate water to the sprayer, so as to further utilize the condensate water.

In some embodiments of the application, the heat exchanger further includes the controller, and the vehicular air conditioning system further includes a humidity sensor; the humidity sensor is configured to detect a humidity of a passenger compartment; and the controller is configured to control the reversing valve to be switched to the second state in a case where the humidity of the passenger compartment is lower than a preset value. In a case where the humidity in the passenger compartment is lower than the preset value, the controller can switch the reversing valve to the second state. At the time, the condensate water subject to heat exchange in the water cooler flows out from the water outlet of the water cooler, flows through the reversing valve and flows to the humidifying connector and arrives at the sprayer. Finally, the condensate water is vaporized to water vapor diffused to air. Therefore, the humidity of air can be increased, so that the comfort of the passenger compartment is guaranteed.

In some embodiments of the application, the vehicular air conditioning system further includes a compressor, a second heat exchanger and an expansion valve, where the compressor, the second heat exchanger, the expansion valve and the heat exchanger form a refrigerant circulation loop. A refrigerant flows through the compressor, the second heat exchanger, the expansion valve and the heat exchanger in sequence, thereby reducing the environment temperature at the heat exchanger body.

The embodiment in the third aspect of the application provides a vehicle, including the vehicular air conditioning system in any one embodiment in the second aspect.

In the embodiment, the vehicle includes the vehicular air conditioning system in any one embodiment in the second aspect, so that it also has the beneficial effects in any one embodiment in the second aspect, which is not repeatedly described herein.

BRIEF DESCRIPTION OF DRAWINGS

By reading detailed description of preferred implementation modes below, various other advantages and benefits will be clear to those of ordinary skill in the art. The accompanying drawings are merely used for illustrating the preferred implementation modes rather than being construed as limitation to this application. Throughout the drawings, same numerals in the drawings indicate same components. In the drawings.

Figure 1:
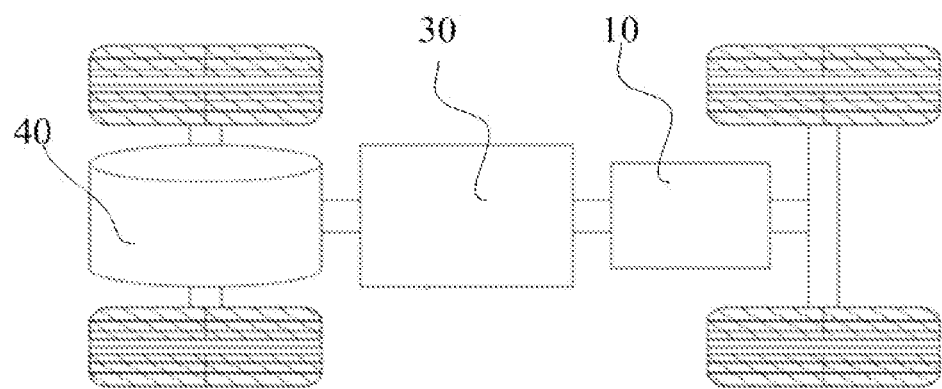
FIG. 1 is a structural schematic diagram of a vehicle adopting a battery in the embodiment.

Numerals in the drawings are illustrated as follows:
1—vehicle; 10—battery; 30—control system; 40—motor;
100—water cooler; 200—water storage tank; 300—power device; 500—reversing valve;
600—switching valve; 700—liquid level sensor; 810—drain outlet; 820—water connector;
830—humidifying connector; 900—catchment tray; 20—heat exchanger body; 21—air-inlet side;
22—air-outlet side; 23—sprayer; 231—air outlet of air conditioner; 232—humidity sensor;
24—compressor; 25—second heat exchanger; 26—expansion valve; 27—fan; 28—controller.

DETAILED DESCRIPTION

The embodiments of the technical solutions of the application will be described in detail below in combination with drawings. The embodiments below are merely used to more clearly describe the technical solutions of the application, merely as examples, instead of limiting the scope of protection of the application.

Unless otherwise defined, all technical and scientific terms used herein are identical to meaning commonly understood by those skilled in the art of the application. The terms used herein are merely used to describe specific embodiments rather than limiting the application. The terms "include" and "have" and any variation thereof in the description, claims and the above description of drawings of the application are intended to cover non-exclusive inclusion.

In description of the application, terms "first", "second" and the like are merely used to distinguish different objects rather than being construed to indicate or imply relative importance or implicitly indicate the quantity, specific order or primary and secondary relation of indicated technical features. In the description of the application, "a plurality of" means two or more, unless expressly specified otherwise.

The "embodiments" in the application mean that specific features, structure or characteristics described in combination with the embodiments may be included in at least one embodiment of the application. The phrase emerges in each position of the description is not necessary the same embodiment or independent or alternative embodiments mutually exclusive to other embodiments. Those skilled in the art explicitly and implicitly understand that the embodiments described herein may combine with other embodiments.

In the description of the application, the term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

In the description of the application, the term "a plurality of" means more than two (including two), and similarly, "a plurality of groups" means more than two groups (including two groups), and "a plurality of sheets" means more than two sheets (including two sheets).

In the description of the application, orientation or position relations indicated by the technical terms "central", "longitudinal", "transverse", "length", "width", "thickness", "upper", "lower", "front", "back", "left", "right", "vertical", "horizontal", "top", "bottom", "inner", "outer", "clockwise", "anticlockwise", "axial", "radial", "circumferential", and the like are orientation or position relations based on the drawings only for ease of description of the application and for simplicity of description, and are not intended to indicate or imply that the referenced device or element must have a particular orientation and be constructed and operative in a particular orientation, and thus may not be construed as a limitation on the present invention.

In the description of the application, unless otherwise specified and defined, the technical terms such as "mount", "connect", "connection" and "fix" shall be understood in a board sense. For example, it can be either fixed connection or detachable connection or integrated connection; either mechanical connection or electrical connection with each other; either direct connection or indirect connection through an intermediate, and communication in two components or interaction relaxation of the two components. Those of ordinary skill in the art can understand specific meaning of the terms in the disclosure under specific circumstances.

At present, to make a passenger compartment have a comfortable temperature and humidity environment, an air conditioning system has been a standard configuration of a vehicle. In related art, there is moisture in air. When the air conditioning system of the vehicle refrigerates, as the temperature of the evaporator is low, moisture in air will condensate on the evaporator to become condensate water. Particularly in a case where air humidity is high, much condensate water will be generated. At present, a conventional treatment mode for condensate water is to drain away the condensate water out of the vehicle. As the temperature of the condensate water is usually lower than 10° C., the cooling capacity of the condensate water is not utilized well. Through repeated researches and discussions, the applicant designs a heat exchanger for a vehicular air conditioning system, which can store the condensate water generated by the heat exchanger and transports the condensate water to the air-inlet side of the heat exchanger by the condensate water circulation device for heat exchanger. Thus, external high-temperature air can be cooled for the first time by utilizing the cooling capacity of the condensate water, so that the cooling capacity of the condensate water can be more effectively utilized. Thus, the cooling capacity of the condensate water can be recycled. Therefore, the energy sources can be saved, and the heat exchanger refrigerates more efficiently.

The heat exchanger for a vehicular air conditioning system disclosed by the embodiment of the application can be applied to various vehicles such as a fuel-engined vehicle, a gas vehicle or a new energy automobile and the like. The new energy automobile can be a battery electric vehicle, a hybrid electric vehicle or an extended range electric vehicle and the like. A motor 40, a controller 30 and a battery 10 can be arranged in the vehicle 1, where the control system 30 is configured to control the battery 10 to supply power to the motor 40. For example, the battery 10 can be arranged at the bottom or head or tail of the vehicle 1. The battery 10 can be used for supplying power to the vehicle 1, for example, the battery 10 can serve as an operating power supply of the vehicle 1 for a circuit system of the vehicle 1, for example, for a working electric demand during start, navigation and running of the vehicle 1. In another embodiment of the application, the battery 10 can not only serve as the operating power supply of the vehicle 1, but also can serve as a driving power supply of the vehicle 1 to replace or partially replace fuel or natural gas to provide driving power to the vehicle 1.

Figure 2:
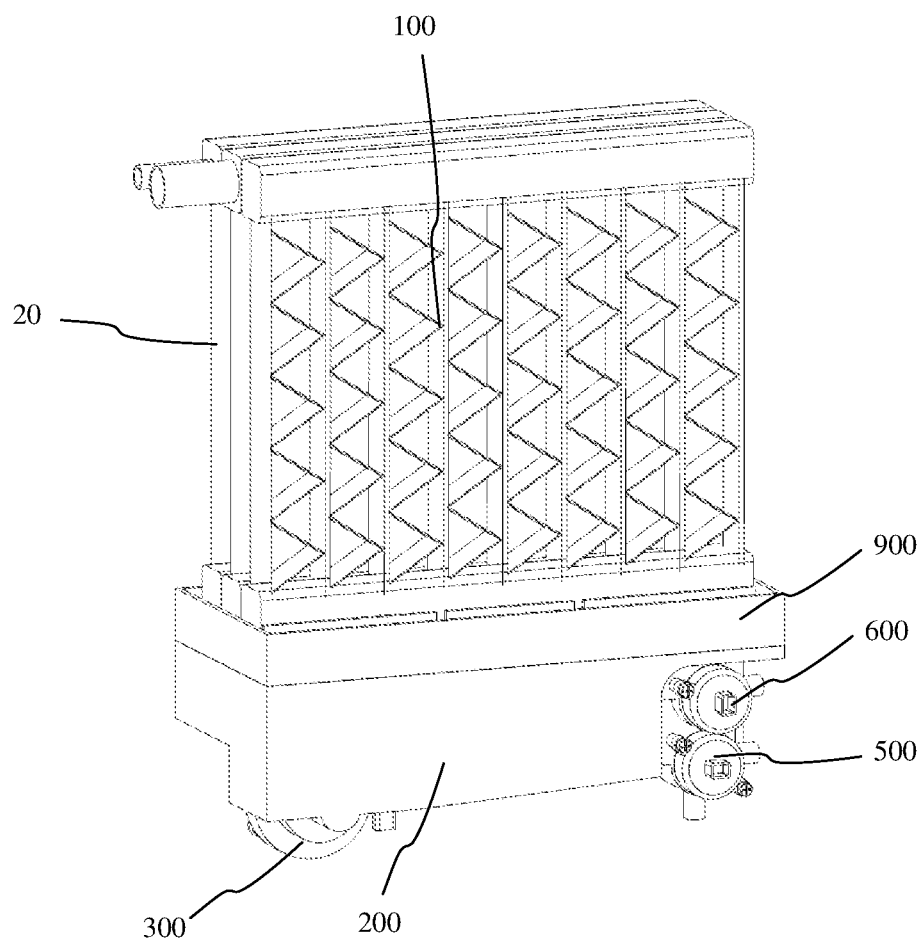
FIG. 2 is a structural schematic diagram of a heat exchanger for a vehicular air conditioning system in the embodiment of the application.
Figure 3:
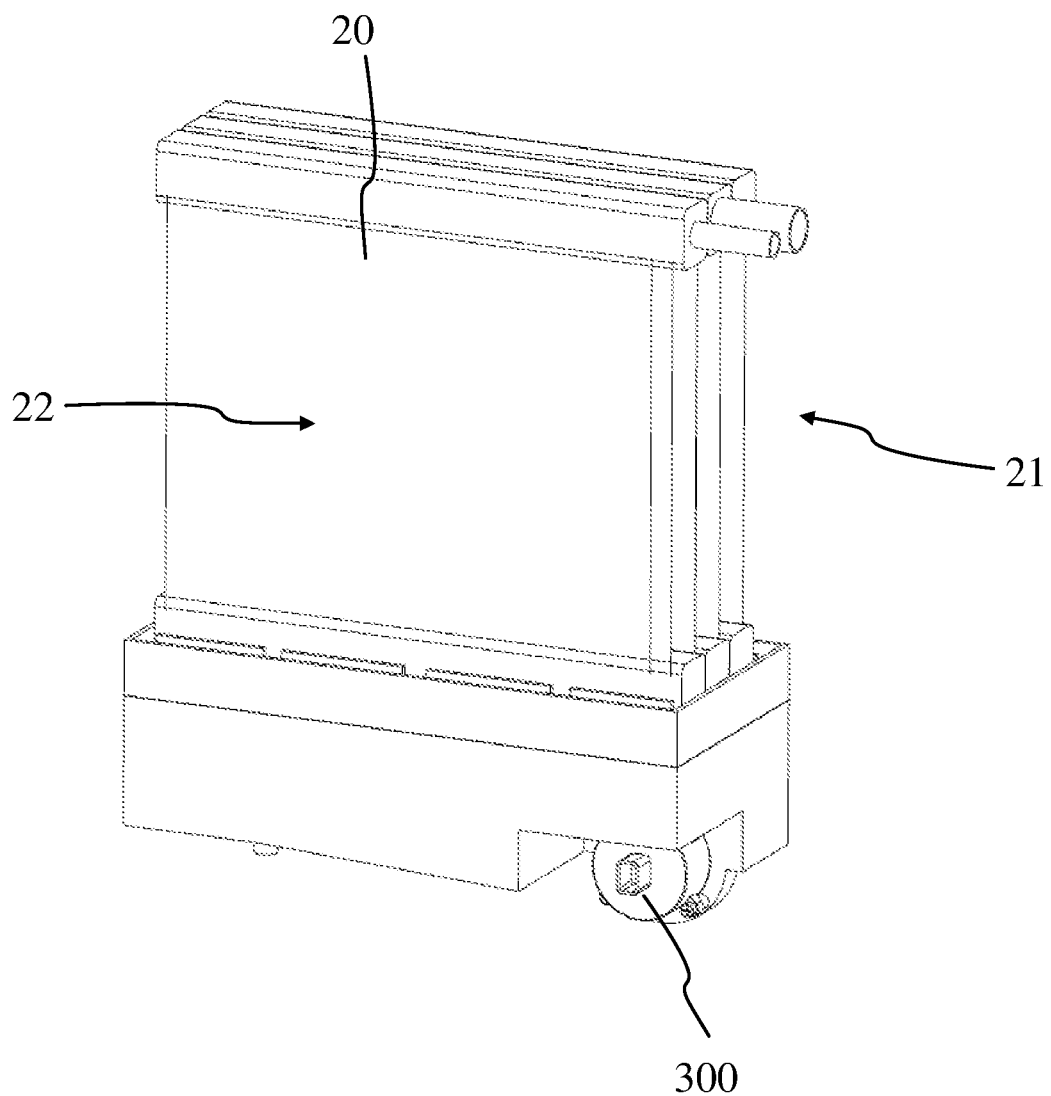
FIG. 3 is a structural schematic diagram of the heat exchanger for a vehicular air conditioning system in the embodiment of the application (viewed from the direction of the heat exchanger)
Figure 4:
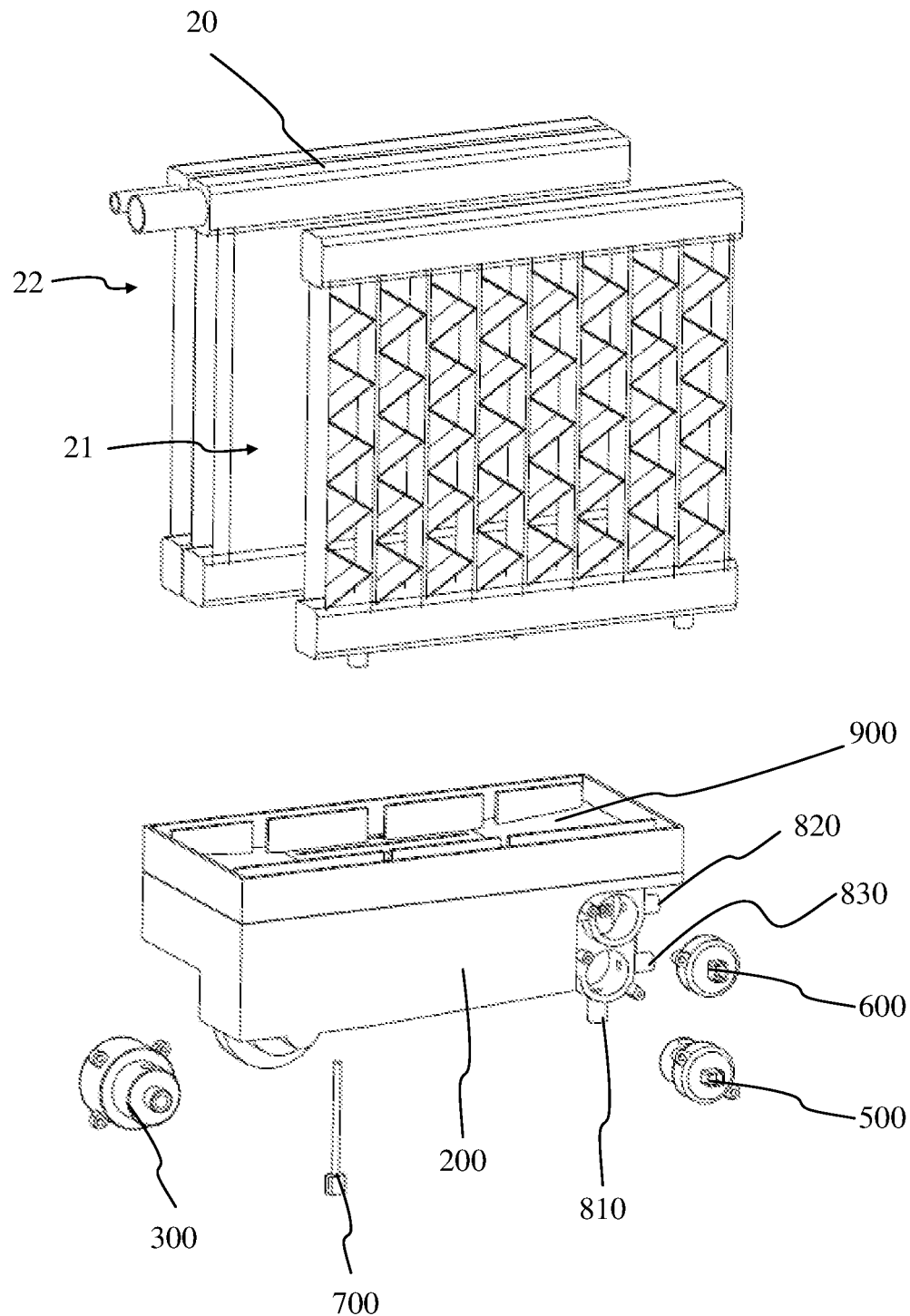
FIG. 4 is an assembly schematic diagram of the heat exchanger for a vehicular air conditioning system in the embodiment of the application.

As shown in FIG. 2-FIG. 4, the embodiment in the first aspect of the application provides a heat exchanger for a vehicular air conditioning system. The heat exchanger for a vehicular air conditioning system includes a heat exchanger body 20, a water storage tank 200 and a condensate water circulating device. The heat exchanger body 20 is provided with an air-inlet side 21 and an air-outlet side 22, where the air-inlet side 21 is configured to enable an external air flow to enter the heat exchanger body 20, so that the air flow conducts heat exchange with a refrigerant in the heat exchanger body 20; and the air-outlet side 22 is configured to exhaust the air flow completing heat exchange with the refrigerant. The water storage tank 200 is arranged below the heat exchanger body 20 and is configured to store condensate water formed on the heat exchanger body 20. The condensate water circulating device is configured to transport condensate water in the water storage tank 200 to the air-inlet side 21 of the heat exchanger body 20 for heat exchange with the heat exchanger body 20.

The heat exchanger is a device achieving mutual heat exchange among fluid media (for example, refrigerant and air) in the air conditioning system. According to different actions in the air conditioning system, the heat exchanger can be specifically divided into the condenser and the evaporator, where the evaporator absorbs heat of external air during work, and the condenser releases heat towards the external air during work. According to different working modes of the air conditioning system, sometimes the evaporator can be converted into the condenser, and the condenser can be converted into the evaporator as well.

The heat exchanger body 20 is a main body structure of the heat exchanger, i.e., a part capable of achieving heat exchange.

The refrigerant is also known as a refrigerating medium which is a working medium of a refrigeration loop in the air conditioning system and transfers heat by means of phase change of the refrigerating medium. For example, the refrigerant evaporated in the evaporator absorbs heat and condensed in the condenser releases heat. At present, there are many types of refrigerants, usually ammonia, Freon, water, a minority of hydrocarbon and the like.

The air-inlet side 21 of the heat exchanger 20 can be construed as the side of air to be cooled or to be heated. When the heat exchanger body 20 works, the air to be cooled or to be heated enters the heat exchanger body 20 from the air-inlet side 21 for heat exchange.

The air-outlet side 22 of the heat exchanger 20 can be construed as the side of air passing through the heat exchanger body 20 for heat exchange, and generally speaking, the air-inlet side 21 and the air-outlet side 22 are respectively located on both sides of the heat exchanger 20.

The water storage tank 200 is a container for storing the condensate water; the water storage tank is internally provided with an accommodation cavity, and is configured to accommodate the condensate water generated by the heat exchanger 20; and an anti-corrosive coating can be smeared to the inner wall of the water storage tank 200 to prevent rust of the water storage tank 200.

The condensate water circulating device is a device which transports the condensate water in the water storage tank 200 to the air-inlet side 21 of the heat exchanger body 20.

According to the heat exchanger for a vehicular air conditioning system in the embodiments of the application, the heat exchanger body 20 will form condensate water during heat exchange. The water storage tank 200 located below the heat exchanger body 20 is capable of storing the condensate water, and the condensate water circulating device transports the condensate water in the water storage tank 200 to the air-inlet side 21 of the heat exchanger body 20 for heat exchange. Thus, when the heat exchanger body 20 is subject to heat exchange, external high-temperature air first exchanges heat with the condensate water transported by the condensate water circulating device to the air-inlet side 21, and then the cooled air flows through the heat exchanger body 20 for secondary heat exchange. Therefore, the external high-temperature air can be cooled for the first time by utilizing the cooling capacity of the condensate water, so that the cooling capacity of the condensate water is more effectively utilized. According to the heat exchanger for a vehicular air conditioning system in the embodiments of the application, the condensate water generated by the heat exchanger body 20 is stored and is transported to the air-inlet side 21 of the heat exchanger body 20, so that the high-temperature air is cooled for the first time by utilizing the cooling capacity of the condensate water, and thus, the cooling capacity of the condensate water can be recovered and utilized.

In some embodiments of the application, the condensate water circulating device includes a water cooler 100 and a power device 300. The water cooler 100 is arranged at the air-inlet side 21 of the heat exchanger body 20, and the power device 300 is configured to transport the condensate water stored in the water storage tank 200 to the water cooler 100.

The water cooler 100 is a device for cooling external air by utilizing water with low temperature, which is one of cooling devices. A fluid channel is formed inside the water cooler 100. In some specific embodiments, the water cooler 100 can be of a netty structure, thus, faster transferring the cooling capacity of the condensate water to the external environment.

The power device 300 is a device which powers transport of the condensate water, for example, various liquid pumps such as a water booster pump and a peristaltic pump. One end of the power device 300 is connected to the interior of the water storage tank 200, and the other end of the power device 300 is connected to the water cooler 100. Thus, the power device 300 is capable of transporting the condensate water from the water storage tank 200 to the water cooler 100 during work.

In the embodiment, by arranging the water cooler 100 at the air-inlet side 21 of the heat exchanger body 20, thus, when the high-temperature air is subject to heat exchange, it first passes through the water cooler 100. Because of low temperature of the condensate water in the water cooler 100, the high-temperature air needing heat exchange can be cooled for the first time. The air cooled for the first time then flows through the heat exchanger body 20 for secondary cooling. Therefore, the high-temperature gas can be cooled by utilizing the cooling capacity of the condensate water well.

In some embodiments of the application, the heat exchanger further includes a catchment tray 900, where the catchment tray 900 is arranged at a bottom of the heat exchanger body 20, is configured to collect the condensate water formed on the heat exchanger body 20 and is communicated with an internal space of the water storage tank 200.

The catchment tray 900 is of a disc structure, which plays a major role of collecting the condensate water. The shape of the catchment tray 900 can be designed according to the shape of the water storage tank 200, and it can be of an opened structure, thereby facilitating collecting the condensate water. The catchment tray 900 can also have an inclined bottom, thus, facilitating importing the condensate water into the water storage tank 200. The catchment tray 900 is communicated with the internal space of the water storage tank 200, the shape of the water storage tank 200 can be in an opened design, and a through hole can be designed at the bottom of the catchment tray 900, thus, water on the catchment tray 900 can flow into the water storage tank 200.

In the embodiment, by arranging the catchment tray 900 at the bottom of the heat exchanger body 20, the condensate water can be collected more conveniently, and the condensate water is exported into the water storage tank 200. Therefore, the condensate water can be prevented from flowing out of the water storage tank 200.

In some embodiments of the application, the catchment tray 900 is further located at the bottom of the water cooler 100 and is further configured to collect the condensate water formed on the water cooler 100.

In the embodiment, the condensate water flows through the interior of the water cooler 100. Because of low temperature of the condensate water, when the high-temperature gas passes through the water cooler 100, condensate water will be formed on the surface of the water cooler 100 as well. Therefore, the catchment tray 900 is arranged at the bottoms of the heat exchanger body 20 and the water cooler 100 at the same time, and thus, the condensate water formed on the heat exchanger body 20 and the water cooler 100 can be collected at the same time.

Figure 5:
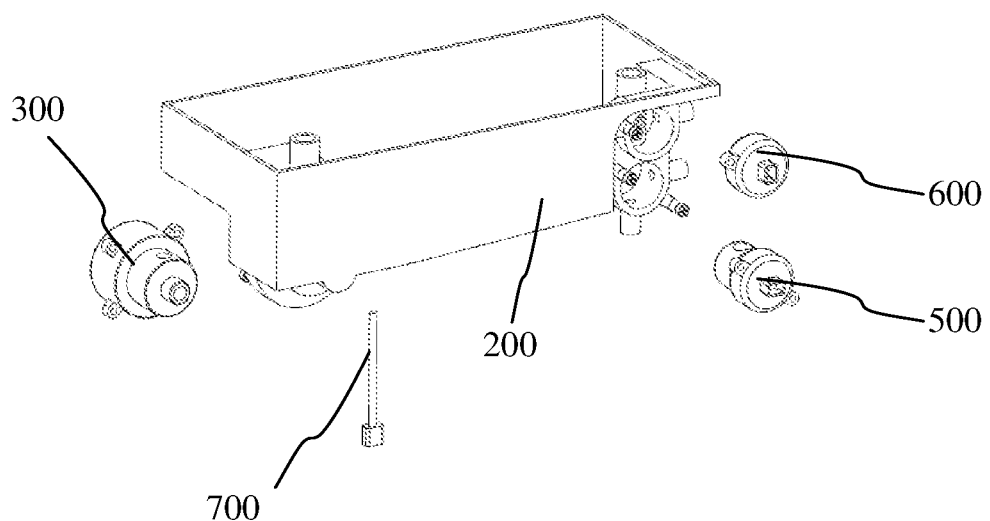
FIG. 5 is a assembly schematic diagram of a water storage tank of the heat exchanger for a vehicular air conditioning system in the embodiment of the application.
Figure 6:
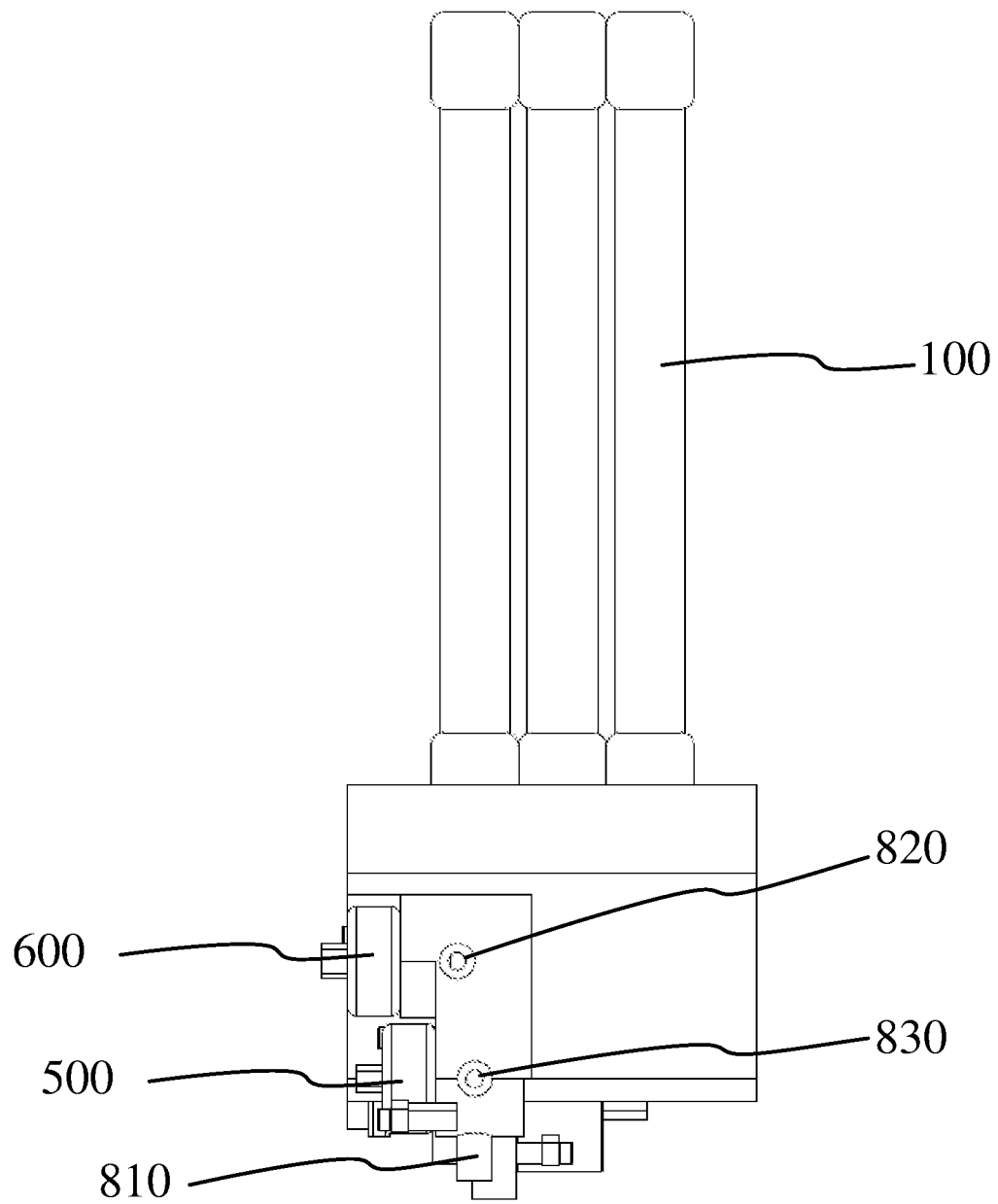
FIG. 6 is a side view of the heat exchanger for a vehicular air conditioning system in the embodiment of the application.

As shown in FIG. 4-FIG. 6, in some embodiments of the application, the heat exchanger further includes a reversing valve 500 arranged on the water storage tank 200, where a water outlet of the water cooler 100 is connected to the reversing valve 500, the water storage tank 200 is further provided with a drain outlet 810 and a humidifying connector 830, the drain outlet 810 is configured to drain away the condensate water, and the humidifying connector 830 is configured to be connected to an external sprayer 23; the reversing valve 500 has a first state and a second state capable of being switched; in a case where the reversing valve 500 is in the first state, the water outlet of the water cooler 100 is connected to the drain outlet 810, and the water outlet of the water cooler 100 is disconnected to the humidifying connector 830; and in a case where the reversing valve 500 is in the second state, the water outlet of the water cooler 100 is connected to the humidifying connector 830, and the water outlet of the water cooler 100 is disconnected to the drain outlet 810.

The reversing valve 500 is a fluid direction control valve which is provided with a plurality of valve ports and is capable of achieving the connected channel and disconnected channel of the plurality of valve ports. The reversing valve usually has a multidirectional adjustable channel, which can change the flow direction of the fluid timely as required. Specifically, the reversing valve 500 can be a manual reversing valve 500, an electromagnetic reversing valve 500 or an electro-hydraulic reversing valve 500.

The water outlet of the water cooler 100 is a port where the condensate water on the water cooler 100 flows out, and the condensate water flowing through the water cooler 100 flows out from the water outlet.

The drain outlet 810 is a port where the condensate water is drained away, and one end of the drain outlet 810 is connected to the reversing valve 500.

The humidifying connector 830 is a port configured to connect the humidifier, and one end of the humidifying connector 830 is connected to the reversing valve 500.

In the embodiment, the reversing valve 500 can have three ports respectively connected to the water outlet of the water cooler 100, the drain outlet 810 and the humidifying connector 830. The reversing valve 500 has the first state and the second state capable of being switched. When the reversing valve is in the first state, the condensate water subject to heat exchanger in the water cooler 100 flows out from the water outlet of the water cooler 100, and flows to the drain outlet 810 after flowing through the reversing valve 500. When the reversing valve is in the second state, the condensate water subject to heat exchanger in the water cooler 100 flows out from the water outlet of the water cooler 100 and flows to the humidifying connector 830 after flowing through the reversing valve 500. In the embodiment, after the condensate water in the water cooler 100 is subject to heat exchange with the external high-temperature air, the condensate water completing heat exchange can be treated according to different demands. Specifically, the condensate water after recycling cooling capacity can be drained away. At the time, the reversing valve 500 can be switched to the first state, and thus, the condensate water can be drained away through the drain outlet 810. Alternatively, when air in the passenger compartment is dry, the condensate water after recycling cooling capacity can be used for humidifying air in the passenger compartment as well. At the time, the reversing valve 500 can be switched to the second state to transport the condensate water to the humidifier, so as to further utilize the condensate water.

In some embodiments of the application, the heat exchanger further includes a switching valve 600 arranged on the water storage tank 200, where the switching valve 600 is connected to the water outlet of the water cooler 100; the water storage tank 200 is further provided with a water connector 820, where the water connector 820 is configured to provide the user with domestic water, and the water connector 820 is connected to the water outlet of the water cooler 100 through the switching valve 600.

The switching valve 600 is a valve capable of controlling the connected channel and disconnected channel of the fluid in the pipeline, and the switching valve 600 can be a manual switching valve 600, an electromagnetic switching valve 600 or an electro-hydraulic switching valve 600.

The water connector 820 is a water connector 820 of domestic water, the water connector 820 is connected to the water outlet of the water cooler 100, and the switching valve 600 is arranged at the connection of the two. Thus, when water is needed, the switching valve 600 can be controlled, so that the water connector 820 and the water outlet of the water cooler 100 form a connected channel. The condensate water can flow to the water connector 820 from the water outlet of the water cooler 100. When water is not needed, the switching valve 600 can be controlled, so that the water connector 820 and the water outlet of the water cooler 100 form a disconnected channel, and the condensate water will not flow to the water connector 820.

In the embodiment, by arranging the water connector 820 and arranging the switching valve 600 between the water connector 820 and the water outlet of the condensate water, the condensate water exchanging heat with the water cooler 100 has multiple purposes.

In some embodiments of the application, the reversing valve 500 further has a third state, and in a case where the reversing valve 500 is in the third state, the water outlet of the water cooler 100 is disconnected to both the drain outlet 810 and the humidifying connector 830.

In the embodiment, the reversing valve 500 can be matched with the switching valve 600 in use. Specifically, the switching valve 600 is opened while providing the user with domestic water, and meanwhile, the reversing valve 500 is switched to the third state. At the time, when the reversing valve 500 is in the third state, the water outlet of the water cooler 100 is disconnected to both the drain outlet 810 and the humidifying connector 830. Thus, the condensate water only flows out from the water connector 820 rather than flowing through the drain outlet 810 and the humidifying connector 830. Therefore, it can be ensured that the water quantity at the water connector 820 can meet a usage requirement.

In some embodiments of the application, the heat exchanger further includes a liquid level sensor 700 and a controller 28, the liquid level sensor 700 and the power device 300 both are electrically connected to the controller 28. The liquid level sensor 700 is arranged in the water storage tank 200 and is configured to detect a liquid level height of the condensate water in the water storage tank 200, and the controller 28 is configured to start the power device 300 in a case where the liquid level height of the condensate water in the water storage tank 200 reaches a preset value.

The liquid level sensor 700 is a sensor capable of measuring the liquid level of the liquid. The liquid level sensor 700 can be a float type liquid level sensor 700, a ball float type liquid level sensor 700 or a static liquid level sensor 700 and the like.

The controller 28 is a master device which controls the working state of a motor, a liquid pump and the like by changing wiring of a main circuit or a control circuit and changing the resistance value in the circuit in a preset sequence. In the embodiment, the controller 28 is capable of receiving liquid level height information sent by the liquid level sensor 700. When the liquid level height reaches a preset value, the controller is capable of starting the power device 300.

In the embodiment, the controller 28 is electrically connected to the liquid level sensor 700 and the power device 300 respectively. The controller 28 is capable of receiving liquid level height information sent by the liquid level sensor 700. When the liquid level height reaches a preset value, the controller 28 is capable of starting the power device 300, so as to prevent the condensate water in the water storage tank 200 exceeding a water storage limit of the water storage tank 200 and causing overflow.

Figure 7:
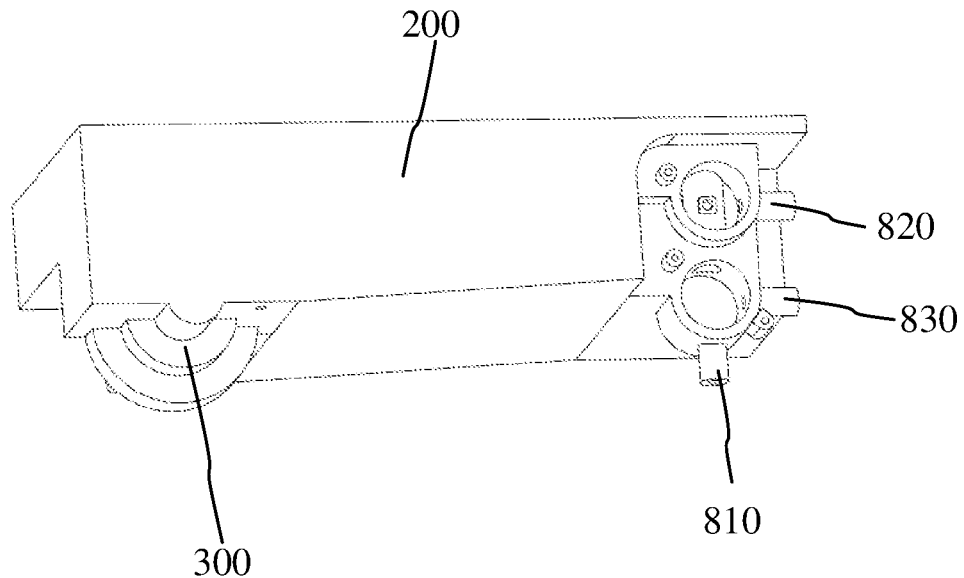
FIG. 7 is a structural schematic diagram of the water storage tank of the heat exchanger for a vehicular air conditioning system in the embodiment of the application (viewed from the bottom to the top)

As shown in FIG. 7, in some embodiments of the application, the power device 300 is a water pump.

The water pump is a device which powers transport of the liquid, which transfers its mechanical energy to the liquid, so that the energy of the liquid is increased to, thus, transport the liquid. The water pump can be a displacement pump, a vane pump, a piston pump and the like, and the embodiment has no particular limitation on specific type of the water pump.

In the embodiment, the condensate water in the water storage tank 200 is transported to the water cooler 100 through the water pump. As the water pump is conventional and has various models, water pumps with different models can be selected as required, and substitutes can be more conveniently found in subsequent maintenance.

In some embodiments of the application, the heat exchanger body 20 is internally provided with a refrigerant channel, and the heat exchanger body 20 is provided with a refrigerant inlet and a refrigerant outlet.

The refrigerant channel can be a coiled tube type. Since the refrigerant will release a lot of heat when being transformed from gaseous state into liquid state and will absorb a lot of heat when being transformed from liquid state into gaseous state, the refrigerant can be subject to heat exchange with external environment more sufficiently when the refrigerant channel is designed in the coiled tube type. The refrigerant channel can be made from copper and can serve as a better heat conduction material.

The refrigerant inlet and the refrigerant outlet are respectively formed in both ends of the refrigerant channel, which are inlet and outlet for transporting the refrigerant.

In the embodiment, the refrigerant is transported in the refrigerant channel inside the heat exchanger body 20. Therefore, the refrigerant in the refrigerant channel is capable of exchanging heat with air in an external environment, so as to play a role of cooling or heating air.

In some embodiments of the application, the heat exchanger for a vehicular air conditioning system includes the heat exchanger body 20, the water storage tank 200, the water cooler 100, the water pump, the catchment tray 900, the reversing valve 500, the switching valve 600, the liquid level sensor 700 and the controller 28. The heat exchanger body 20 is provided with an air-inlet side 21 and an air-outlet side 22, where the air-inlet side 21 is configured to enable an external air flow to enter the heat exchanger body 20, so that the air flow conducts heat exchange with a refrigerant in the heat exchanger body 20; and the air-outlet side 22 is configured to exhaust the air flow completing heat exchange with the refrigerant. The water storage tank 200 is arranged below the heat exchanger body 20 and is configured to store condensate water formed on the heat exchanger body 20. The water cooler 100 is arranged at the air-inlet side 21 of the heat exchanger body 20 and the water pump is configured to transport the condensate water stored in the water storage tank 200 to the water cooler 100 for heat exchange with the heat exchanger body 20. The catchment tray 900 is arranged at the bottoms of the heat exchanger body 20 and the water cooler 100, and is configured to collect the condensate water formed on the heat exchanger body 20 and the water cooler 100, and is communicated with an internal space of the water storage tank 200. The water outlet of the water cooler 100 is connected to the reversing valve 500, the water storage tank 200 is further provided with the drain outlet 810 and the humidifying connector 830, the drain outlet 810 is configured to drain away the condensate water, and the humidifying connector 830 is configured to be connected to the external sprayer 23; the reversing valve 500 has the first state and the second state capable of being switched; in a case where the reversing valve 500 is in the first state, the water outlet of the water cooler 100 is connected to the drain outlet 810, and the water outlet of the water cooler 100 is disconnected to the humidifying connector 830; in a case where the reversing valve 500 is in the second state, the water outlet of the water cooler 100 is connected to the humidifying connector 830, and the water outlet of the water cooler 100 is disconnected to the drain outlet 810; and in a case where the reversing valve 500 is in the third state, the water outlet of the water cooler 100 is disconnected to both the drain outlet 810 and the humidifying connector 830. The switching valve 600 is connected to the water outlet of the water cooler 100, the water storage tank 200 is further provided with the water connector 820, the water connector 820 is configured to provide the user with domestic water, and the water connector 820 is connected to the water outlet of the water cooler 100 through the switching valve 600. The liquid level sensor 700 and the water pump both are electrically connected to the controller 28, the liquid level sensor 700 is arranged in the water storage tank 200 and is configured to detect a liquid level height of the condensate water in the water storage tank 200, and the controller 28 is configured to start the water pump in a case where the liquid level height of the condensate water in the water storage tank 200 reaches the preset value.

In the embodiment, the heat exchanger body 20 will form condensate water during heat exchange. The water storage tank 200 located below the heat exchanger body 20 is capable of storing the condensate water, and the water pump transports the condensate water in the water storage tank 200 to the water cooler 100 and finally transports the condensate water to the air-inlet side 21 of the heat exchanger body 20 for heat exchange. Thus, when the heat exchanger body 20 is subject to heat exchange, external high-temperature air first exchanges heat with the condensate water, and then the cooled air flows through the heat exchanger body 20 for secondary heat exchange. Therefore, the external high-temperature air can be cooled for the first time by utilizing the cooling capacity of the condensate water, so that the cooling capacity of the condensate water is more effectively utilized.

Furthermore, the condensate water flows through the interior of the water cooler 100. Because of low temperature of the condensate water, when the high-temperature gas passes through the water cooler 100, the condensate water will be formed on the surface of the water cooler 100 as well. Therefore, the catchment tray 900 is arranged at the bottoms of the heat exchanger body 20 and the water cooler 100 at the same time, and thus, the condensate water formed on the heat exchanger body 20 and the water cooler 100 can be collected at the same time.

Further, the reversing valve 500 has the first state, the second state and the third state capable of being switched. When the reversing valve is in the first state, the condensate water subject to heat exchanger in the water cooler 100 flows out from the water outlet of the water cooler 100, and flows to the drain outlet 810 after flowing through the reversing valve 500. When the reversing valve is in the second state, the condensate water subject to heat exchanger in the water cooler 100 flows out from the water outlet of the water cooler 100 and flows to the humidifying connector 830 after flowing through the reversing valve 500. After the condensate water in the water cooler 100 is subject to heat exchange with the external high-temperature air, the condensate water completing heat exchange can be treated according to different demands. Specifically, the condensate water after recycling cooling capacity can be drained away. At the time, the reversing valve 500 can be switched to the first state, and thus, the condensate water can be drained away through the drain outlet 810. Alternatively, when air in the passenger compartment is dry, the condensate water after recycling cooling capacity can be used for humidifying air in the passenger compartment as well. At the time, the reversing valve 500 can be switched to the second state to transport the condensate water to the humidifier, so as to further utilize the condensate water. Alternatively, when the user needs to use the domestic water, the reversing valve 500 can be switched to the third state while the switching valve 600 is opened. At the time, the water outlet of the water cooler 100 is disconnected to both the drain outlet 810 and the humidifying connector 830. The condensate water only flows out from the water connector 820 to provide the user with the domestic water. Moreover, the water quantity at the water connector 820 can meet the usage requirement.

Finally, the controller 28 is electrically connected to the liquid level sensor 700 and the power device 300 respectively. The controller 28 is capable of receiving liquid level height information sent by the liquid level sensor 700. When the liquid level height reaches the preset value, the controller 28 is capable of starting the power device 300, so as to prevent the condensate water in the water storage tank 200 exceeding a water storage limit of the water storage tank 200 and causing overflow.

The embodiment in the second aspect of the application provides a vehicular air conditioning system. The vehicular air conditioning system includes the heat exchanger for a vehicular air conditioning system in any one embodiment in the first aspect.

In the embodiment, since the vehicular air conditioning system includes the vehicular air conditioning system in any one embodiment in the first aspect, it also has the beneficial effects in any one embodiment in the first aspect. Specifically, the heat exchanger for a vehicular air conditioning system in the embodiments of the application includes the heat exchanger body 20, where the heat exchanger body 20 will form condensate water during heat exchange. The water storage tank 200 located below the heat exchanger body 20 is capable of storing the condensate water, and the condensate water circulating device transports the condensate water in the water storage tank 200 to the air-inlet side 21 of the heat exchanger body 20 for heat exchange. Thus, when the heat exchanger body 20 is subject to heat exchange, external high-temperature air first exchanges heat with the condensate water transported by the condensate water circulating device to the air-inlet side 21, and then the cooled air flows through the heat exchanger body 20 for secondary heat exchange. Therefore, the external high-temperature air can be cooled for the first time by utilizing the cooling capacity of the condensate water, so that the cooling capacity of the condensate water is more effectively utilized. According to the vehicular air conditioning system in the embodiment, the condensate water generated by the heat exchanger body 20 is stored and is transported to the air-inlet side 21 of the heat exchanger body 20, so that the high-temperature air is cooled for the first time by utilizing the cooling capacity of the condensate water, and thus, the cooling capacity of the condensate water can be recovered and utilized.

In some embodiments of the application, the heat exchanger further includes the reversing valve 500 arranged on the water storage tank 200, where the water outlet of the water cooler 100 is connected to the reversing valve 500, the water storage tank 200 is further provided with the drain outlet 810 and the humidifying connector 830, and the drain outlet 810 is configured to drain away the condensate water; the reversing valve 500 has the first state and the second state capable of being switched; in a case where the reversing valve 500 is in the first state, the water outlet of the water cooler 100 is connected to the drain outlet 810, and the water outlet of the water cooler 100 is disconnected to the humidifying connector 830; and in a case where the reversing valve 500 is in the second state, the water outlet of the water cooler 100 is connected to the humidifying connector 830, and the water outlet of the water cooler 100 is disconnected to the drain outlet 810. The vehicular air conditioning system further includes the sprayer 23 connected to the humidifying connector 830.

The sprayer 23 can be also known as a humidifier which converts water into water vapor, thereby improving the humidity of air. The sprayer 23 can be either an ultrasonic sprayer 23 or a direct evaporation sprayer 23 or a thermal evaporation sprayer 23, and the embodiment has no particular limitation to specific type of the sprayer 23.

In the embodiment, the vehicular air conditioning system further includes the sprayer 23 connected to the humidifying connector 830. The reversing valve 500 has the first state and the second state capable of being switched. After the condensate water in the water cooler 100 is subject to heat exchange with the external high-temperature air, the condensate water completing heat exchange can be treated according to different demands. Specifically, the condensate water after recycling cooling capacity can be drained away. At the time, the reversing valve 500 can be switched to the first state, and thus, the condensate water can be drained away through the drain outlet 810. Alternatively, when air in the passenger compartment is dry, the condensate water after recycling cooling capacity can be used for humidifying air in the passenger compartment as well. At the time, the reversing valve 500 can be switched to the second state to transport the condensate water to the sprayer 23, so as to further utilize the condensate water.

In some embodiments of the application, the heat exchanger further includes the controller 28, and the vehicular air conditioning system further includes the humidity sensor 232; the humidity sensor 232 is configured to detect a humidity of the passenger compartment; and the controller 28 is configured to control the reversing valve 500 to be switched to the second state in a case where the humidity of the passenger compartment is lower than the preset value.

In the embodiment, in a case where the humidity in the passenger compartment is lower than the preset value, the controller 28 can switch the reversing valve 500 to the second state. At the time, the condensate water subject to heat exchange in the water cooler 100 flows out from the water outlet of the water cooler 100, flows through the reversing valve 500 and flows to the humidifying connector 830 and arrives at the sprayer 23. Finally, the condensate water is vaporized to water vapor which flows through the air outlet 231 of the air conditioner and is diffused to air. Therefore, the humidity of air can be increased, so that the comfort of the passenger compartment is guaranteed.

Figure 8:
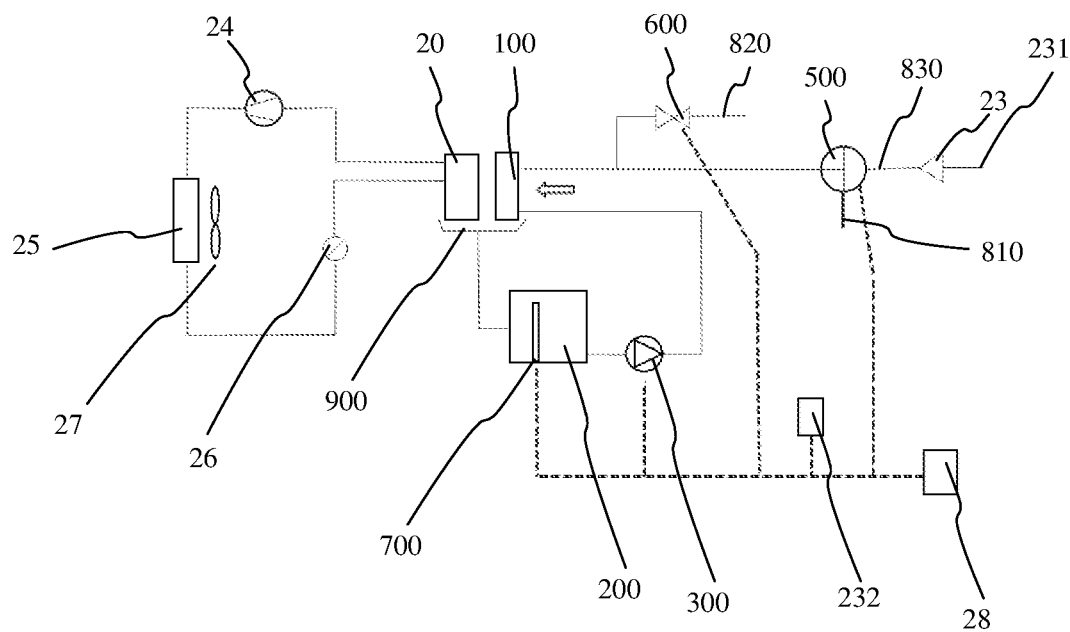
FIG. 8 is a schematic diagram of a system principle of the heat exchanger for a vehicular air conditioning system in the embodiment of the application.

As shown in FIG. 8, in some embodiments of the application, the vehicular air conditioning system further includes the compressor 24, the second heat exchanger 25 and the expansion valve 26, where the compressor 24, the second heat exchanger 25, the expansion valve 26 and the heat exchanger form a refrigerant circulation loop.

The compressor 24 is a driven fluid machine which boots a low pressure gas to a high pressure. The compressor sucks the low-temperature and low-pressure refrigerant gas from the gas suction pipe and the motor runs to drive the piston to compress the refrigerant gas. The compressor discharges the high-temperature and high-pressure refrigerant liquid to the exhaust pipe so as to provide power to refrigeration cycle.

The second heat exchanger 25 and the heat exchanger body 20 are similar in function, which is not described repeatedly herein.

The expansion valve 26, an important part in the refrigeration system, is capable of throttling a medium-temperature and high-pressure liquid refrigerant to low-temperature and low-pressure wet vapor, then the refrigerant absorbs heat in the evaporator to achieve the refrigeration effect, and the expansion valve 26 controls the flow of the valve by means of change of degree of superheat at the tail end of the evaporator, so as to prevent under-utilization of the area of the evaporator and the knocking phenomenon.

In the embodiment, the compressor 24 compresses the refrigerant into the high-temperature and high-pressure gaseous refrigerant which is then transported to the second heat exchanger 25. At the time, the gaseous refrigerant passing through a second radiator is capable of being liquefied to a normal-temperature and high-pressure liquid refrigerant and dissipates heat to the external environment. Therefore, the second heat exchanger 25 blows out hot air at the time, then the refrigerant enters the expansion valve 26, the expansion valve 26 is capable of throttling the normal-temperature and high-pressure liquid refrigerant into low-temperature and low-pressure wet vapor, and the wet vapor entering the heat exchanger body 20 is capable of absorbing a lot of heat from the external environment, and at the time, the temperature of air surrounding the heat exchanger body 20 will be reduced. When the high-temperature air in the external environment enters from the air-inlet side 21 of the heat exchanger body 20, it will be subject to heat exchange with the heat exchanger body 20, the cooled air is blown to the external environment from the air-outlet side 22 of the heat exchanger body 20, and at the same time, the water vapor in air encountering the cold heat exchanger will be condensed to the condensate water and flows into the water storage tank 200. In the embodiment, the condensate water circulating device is capable of transporting the condensate water in the water storage tank 200 to the air-inlet side 21 of the heat exchanger body 20. Therefore, the high-temperature gas is first subject to the condensate water transported to the air-inlet side 21 by the condensate water circulating device, and then the cooled air flows through the heat exchanger body 20 for secondary heat exchange. Therefore, the external high-temperature air can be cooled for the first time by utilizing the cooling capacity of the condensate water, so that the cooling capacity of the condensate water is more effectively utilized.

In some specific embodiments, the fan 27 can be arranged at one side of the second heat exchanger 25. When the heat exchanger body 20 of the vehicular air conditioning system conducts refrigeration, the second heat exchanger 25 will blow out hot air. The fan 27 is arranged to accelerate air motion near the second heat exchanger 25 to cool the second heat exchanger 25, so as to prevent over temperature during work.

The embodiment in the third aspect of the application provides a vehicle, including the vehicular air conditioning system in any one embodiment in the second aspect.

The vehicle can be either a motor vehicle or a non-motor vehicle, an automobile or a diesel vehicle or an electric automobile, and the embodiment has no particular limitation to the vehicle.

In the embodiment, the vehicle includes the vehicular air conditioning system in any one embodiment in the second aspect, so that it also has the beneficial effects in any one embodiment in the second aspect. Specifically speaking, according to the vehicle in the embodiment, the vehicular air conditioning system in the vehicle includes the heat exchanger body 20; the heat exchanger body 20 will form condensate water during heat exchange. The water storage tank 200 located below the heat exchanger body 20 is capable of storing the condensate water, and the condensate water circulating device transports the condensate water in the water storage tank 200 to the air-inlet side 21 of the heat exchanger body 20 for heat exchange. Thus, when the heat exchanger body 20 is subject to heat exchange, external high-temperature air first exchanges heat with the condensate water transported by the condensate water circulating device to the air-inlet side 21, and then the cooled air flows through the heat exchanger body 20 for secondary heat exchange. Therefore, the external high-temperature air can be cooled for the first time by utilizing the cooling capacity of the condensate water, so that the cooling capacity of the condensate water is more effectively utilized. According to the vehicle in the embodiment, the condensate water generated by the heat exchanger body 20 is stored and is transported to the air-inlet side 21 of the heat exchanger body 20, so that the high-temperature air is cooled for the first time by utilizing the cooling capacity of the condensate water, and thus, the cooling capacity of the condensate water can be recovered and utilized.

In conclusion, it should be noted that the above examples are merely intended for describing the technical solutions of this application but not for limiting this application. Although this application is described in detail with reference to the foregoing examples, persons of ordinary skill in the art should understand that they may still make modifications to the technical solutions described in the foregoing examples or make equivalent replacements to some or all technical features thereof without departing from the scope of the technical solutions of the examples of this application. They shall be within the scope of claims and description of this application. In particular, provided no structural conflict exists, the technical features mentioned in the embodiments can be combined in any way. The application is not limited to specific embodiments disclosed herein, and will include all embodiments falling within the scope of the claims.

What is claimed is:

1. A heat exchanger for a vehicle air conditioning system, comprising:
    a heat exchanger body, provided with an air-inlet side and an air-outlet side, wherein the air-inlet side is configured to enable an external air flow to enter the heat exchanger body, so that the air flow conducts heat exchange with a refrigerant in the heat exchanger body, and the air-outlet side is configured to exhaust the air flow to a passage compartment of the vehicle, completing heat exchange with the refrigerant;
    a water storage tank, arranged below the heat exchanger body and configured to store condensate water formed on the heat exchanger body; and
    a condensate water circulating device;
    wherein the condensate water circulating device comprises:
    a water cooler arranged on the air-inlet side of the heat exchanger body, configured to cool the air flow using the condensate water before the air flow entering the heat exchange body; and
    a water pump configured to transport the condensate water stored in the water storage tank to the water cooler;
    wherein the heat exchanger further comprises a liquid level sensor and a controller, the liquid level sensor and the water pump both are electrically connected to the controller, the liquid level sensor is arranged in the water storage tank and is configured to detect a liquid level height of the condensate water in the water storage tank, and the controller is configured to start the water pump in a case where the liquid level height of the condensate water in the water storage tank reaches a preset value;
    wherein the heat exchanger further comprises a catchment tray, and the catchment tray is arranged at a bottom of the heat exchanger body, is configured to collect the condensate water formed on the heat exchanger body, and is communicated with an internal space of the water storage tank; and
    wherein the catchment tray is further located at the bottom of the water cooler and is further configured to collect the condensate water formed on the water cooler.

2. The heat exchanger according to claim 1, wherein the heat exchanger further comprises a reversing valve arranged on the water storage tank, a water outlet of the water cooler is connected to the reversing valve, the water storage tank is further provided with a drain outlet and a humidifying connector, the drain outlet is configured to drain away the condensate water, and the humidifying connector is configured to be connected to an external sprayer;

the reversing valve has a first state and a second state capable of being switched;

in a case where the reversing valve is in the first state, the water outlet of the water cooler is connected to the drain outlet, and the water outlet of the water cooler is disconnected to the humidifying connector; and in a case where the reversing valve is in the second state, the water outlet of the water cooler is connected to the humidifying connector, and the water outlet of the water cooler is disconnected to the drain outlet.

3. The heat exchanger according to claim 2, wherein the heat exchanger further comprises a switching valve arranged on the water storage tank, the switching valve is connected to the water outlet of the water cooler, the water storage tank is further provided with a water connector, the water connector is configured to provide a user with domestic water, and the water connector is connected to the water outlet of the water cooler through the switching valve.

4. The heat exchanger according to claim 3, wherein the reversing valve further has a third state, and in a case where the reversing valve is in the third state, the water outlet of the water cooler is disconnected to both the drain outlet and the humidifying connector.

5. The heat exchanger according to claim 1, wherein the heat exchanger body is internally provided with a refrigerant channel, and the heat exchanger body is provided with a refrigerant inlet and a refrigerant outlet.

6. A vehicle air conditioning system, comprising the heat exchanger according to claim 1.

7. The vehicle air conditioning system according to claim 6, wherein the heat exchanger further comprises a reversing valve arranged on the water storage tank, the water outlet of the water cooler is connected to the reversing valve, the water storage tank is further provided with a drain outlet and a humidifying connector, and the drain outlet is configured to drain away the condensate water;

the reversing valve has a first state and a second state capable of being switched;

in a case where the reversing valve is in the first state, the water outlet of the water cooler is connected to the drain outlet, and the water outlet of the water cooler is disconnected to the humidifying connector;

in a case where the reversing valve is in the second state, the water outlet of the water cooler is connected to the humidifying connector, and the water outlet of the water cooler is disconnected to the drain outlet; and the vehicle air conditioning system further comprises a sprayer connected to the humidifying connector.

8. The vehicle air conditioning system according to claim 7, wherein the heat exchanger further comprises the controller, and the vehicle air conditioning system further comprises a humidity sensor;

the humidity sensor is configured to detect a humidity of a passenger compartment; and the controller is configured to control the reversing valve to be switched to the second state in a case where the humidity of the passenger compartment is lower than a preset value.

9. The vehicle air conditioning system according to claim 6, wherein the vehicle air conditioning system further comprises a compressor, a second heat exchanger and an expansion valve, and the compressor, the second heat exchanger, the expansion valve and the heat exchanger form a refrigerant circulation loop.

10. A vehicle, comprising the vehicle air conditioning system according to claim 6.

* * * * *